(12) United States Patent
Nakagawa (10) Patent No.: US 10,963,055 B2
(45) Date of Patent: Mar. 30, 2021

(54) VIBRATION DEVICE AND CONTROL SYSTEM FOR PRESENTING CORRECTED VIBRATION DATA

(71) Applicant: Sony Interactive Entertainment Inc., Tokyo (JP)

(72) Inventor: Yusuke Nakagawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/344,601

(22) PCT Filed: Dec. 7, 2017

(86) PCT No.: PCT/JP2017/044074
§ 371 (c)(1),
(2) Date: Apr. 24, 2019

(87) PCT Pub. No.: WO2018/110434
PCT Pub. Date: Jun. 21, 2018

(65) Prior Publication Data
US 2019/0278371 A1    Sep. 12, 2019

(30) Foreign Application Priority Data

Dec. 15, 2016  (JP) .............................. JP2016-243641

(51) Int. Cl.
*G06F 3/01* (2006.01)
*A63F 13/285* (2014.01)
(Continued)

(52) U.S. Cl.
CPC ............ *G06F 3/016* (2013.01); *A63F 13/285* (2014.09); *G06F 3/01* (2013.01); *A63F 13/28* (2014.09); *B06B 1/02* (2013.01)

(58) Field of Classification Search
CPC ...... A63F 13/211; A63F 13/23; A63F 13/235; A63F 13/24; A63F 13/28; A63F 13/285;
(Continued)

(56) References Cited

U.S. PATENT DOCUMENTS 5,889,670 A   3/1999  Schuler
6,766,299 B1  7/2004  Bellomo
(Continued)

FOREIGN PATENT DOCUMENTS

EP    0999518 A1   5/2000
JP    0884858 A    4/1996
(Continued)

OTHER PUBLICATIONS

International Preliminary Report on Patentability and Written Opinion for related application PCT/JP2017/016552, 13 pages, dated Nov. 7, 2019.
(Continued)

*Primary Examiner* — Stephen R Burgdorf
(74) *Attorney, Agent, or Firm* — Matthew B. Dernier, Esq.

(57) ABSTRACT

Provided is a control system that includes a vibration mechanism that generates a vibration and presents the vibration to a user and a control apparatus that controls the vibration mechanism. The control apparatus acquires vibration data representative of a waveform of a vibration that is to be generated by the vibration mechanism and causes the vibration mechanism to generate a vibration in accordance with corrected vibration data obtained by executing processing for reducing part of frequency components, included in the waveform represented by the acquired vibration data, other than a resonant frequency of the vibration mechanism.

7 Claims, 4 Drawing Sheets

(51) Int. Cl.
    *A63F 13/28*     (2014.01)
    *B06B 1/02*     (2006.01)

(58) Field of Classification Search
    CPC .......... A63F 13/424; A63F 13/92; B06B 1/02;
                    B06B 1/16; G05B 19/042; G05B 19/188;
                    G05B 19/19; G05D 15/01; G06F 1/3212;
                    G06F 1/3259; G06F 3/01; G06F 3/016;
                    G06F 3/0346; G06F 3/03547; G06F
                3/0383; G06F 3/041; G06F 3/0416; G06F
                                    9/542; G08B 6/00
    USPC ...................................................... 340/407.2
    See application file for complete search history.

(56) References Cited

U.S. PATENT DOCUMENTS

| | | | |
|---|---|---|---|
| 6,864,877 B2 | 3/2005 | Braun | |
| 7,010,488 B2 | 3/2006 | van Santen | |
| 7,218,310 B2 | 5/2007 | Goldenberg | |
| 8,248,218 B2 | 8/2012 | Yamaya | |
| 8,249,276 B2 | 8/2012 | Hamada | |
| 8,325,144 B1 | 12/2012 | Tierling | |
| 8,487,759 B2 | 7/2013 | Hill | |
| 8,727,878 B2 | 5/2014 | Longdale | |
| 8,787,586 B2 | 7/2014 | Hamada | |
| 9,007,445 B2 | 4/2015 | Oikawa | |
| 9,070,282 B2 | 6/2015 | Clough | |
| 9,098,984 B2 | 8/2015 | Heubel | |
| 9,135,791 B2 | 9/2015 | Nakamura | |
| 9,430,700 B2 | 8/2016 | Yagcioglu | |
| 9,436,280 B2 | 9/2016 | Tartz | |
| 9,542,745 B2 | 1/2017 | Moteki | |
| 9,630,098 B2 | 4/2017 | Mikhailov | |
| 9,753,537 B2 | 9/2017 | Obana | |
| 9,792,501 B1* | 10/2017 | Maheriya | G06K 9/00671 |
| 9,846,484 B2 | 12/2017 | Shah | |
| 9,940,716 B2 | 4/2018 | Chevassus | |
| 9,946,347 B2 | 4/2018 | Nakagawa | |
| 9,952,670 B2 | 4/2018 | Watanabe | |
| 9,983,671 B2 | 5/2018 | Adachi | |
| 10,109,161 B2 | 10/2018 | Shah | |
| 10,150,029 B2 | 12/2018 | Yamano | |
| 10,175,761 B2 | 1/2019 | Cruz-Hernandez | |
| 10,347,093 B2 | 7/2019 | Rihn | |
| 10,394,326 B2 | 8/2019 | Ono | |
| 10,444,837 B2 | 10/2019 | Takeda | |
| 2002/0030663 A1 | 3/2002 | Goldenberg | |
| 2002/0080112 A1 | 6/2002 | Braun | |
| 2002/0163498 A1 | 11/2002 | Chang | |
| 2003/0030619 A1 | 2/2003 | Martin | |
| 2003/0212555 A1 | 11/2003 | van Santen | |
| 2004/0220812 A1 | 11/2004 | Bellomo | |
| 2005/0134562 A1* | 6/2005 | Grant | G06F 3/016 |
| | | | 345/161 |
| 2007/0091063 A1 | 4/2007 | Nakamura | |
| 2007/0248235 A1 | 10/2007 | Hamada | |
| 2008/0204266 A1 | 8/2008 | Malmberg | |
| 2008/0262658 A1 | 10/2008 | Ding | |
| 2009/0017911 A1 | 1/2009 | Miyazaki | |
| 2010/0016077 A1 | 1/2010 | Longdale | |
| 2010/0085462 A1 | 4/2010 | Sako | |
| 2010/0090815 A1 | 4/2010 | Yamaya | |
| 2010/0091096 A1 | 4/2010 | Oikawa | |
| 2010/0245237 A1 | 9/2010 | Nakamura | |
| 2011/0039606 A1* | 2/2011 | Kim | H04W 52/0261 |
| | | | 455/574 |
| 2011/0075835 A1 | 3/2011 | Hill | |
| 2011/0163946 A1 | 7/2011 | Tartz | |
| 2012/0232780 A1 | 9/2012 | Delson | |
| 2012/0281849 A1 | 11/2012 | Hamada | |
| 2013/0057509 A1 | 3/2013 | Cruz-Hernandez | |
| 2013/0250502 A1* | 9/2013 | Tossavainen | H04M 1/03 |
| | | | 361/679.01 |
| 2013/0261811 A1* | 10/2013 | Yagi | G06F 3/03547 |
| | | | 700/280 |
| 2014/0169795 A1 | 6/2014 | Clough | |
| 2014/0176415 A1* | 6/2014 | Buuck | G06F 3/016 |
| | | | 345/156 |
| 2014/0212000 A1 | 7/2014 | Yagcioglu | |
| 2014/0220520 A1 | 8/2014 | Salamini | |
| 2014/0266644 A1 | 9/2014 | Heubel | |
| 2014/0361956 A1 | 12/2014 | Mikhailov | |
| 2015/0042484 A1* | 2/2015 | Bansal | G08B 29/00 |
| | | | 340/693.3 |
| 2015/0059086 A1 | 3/2015 | Clough | |
| 2015/0070261 A1 | 3/2015 | Saboune | |
| 2015/0243016 A1 | 8/2015 | Moteki | |
| 2015/0273322 A1 | 10/2015 | Nakagawa | |
| 2015/0297990 A1 | 10/2015 | Mahlmeister | |
| 2015/0302854 A1 | 10/2015 | Clough | |
| 2015/0323996 A1 | 11/2015 | Obana | |
| 2015/0339819 A1 | 11/2015 | Chevassus | |
| 2016/0012687 A1* | 1/2016 | Obana | A63F 13/285 |
| | | | 340/407.1 |
| 2016/0054797 A1 | 2/2016 | Tokubo | |
| 2016/0124707 A1 | 5/2016 | Ermilov | |
| 2016/0132117 A1 | 5/2016 | Asachi | |
| 2016/0162025 A1 | 6/2016 | Shah | |
| 2016/0214007 A1* | 7/2016 | Yamashita | A63F 13/92 |
| 2016/0310844 A1* | 10/2016 | Yamashita | A63F 13/28 |
| 2016/0342213 A1 | 11/2016 | Endo | |
| 2017/0038841 A1 | 2/2017 | Takeda | |
| 2017/0045991 A1 | 2/2017 | Watanabe | |
| 2017/0053502 A1 | 2/2017 | Shah | |
| 2017/0061784 A1 | 3/2017 | Clough | |
| 2017/0092084 A1 | 3/2017 | Rihn | |
| 2017/0097681 A1 | 4/2017 | Ono | |
| 2017/0205883 A1 | 7/2017 | Tanaka | |
| 2017/0235364 A1 | 8/2017 | Nakamura | |
| 2017/0242486 A1* | 8/2017 | Grant | G06F 3/0346 |
| 2018/0067313 A1 | 3/2018 | Sako | |
| 2018/0098583 A1 | 4/2018 | Keller | |
| 2018/0203509 A1 | 7/2018 | Yamano | |
| 2019/0105563 A1 | 4/2019 | Yamano | |
| 2019/0332174 A1 | 10/2019 | Nakagawa | |
| 2019/0334426 A1 | 10/2019 | Culbertson | |
| 2019/0369730 A1* | 12/2019 | Marchant | G06F 3/0412 |
| 2020/0225755 A1 | 7/2020 | Lee | |
| 2020/0359687 A1* | 11/2020 | Scatterday | A24F 40/40 |

FOREIGN PATENT DOCUMENTS

| | | |
|---|---|---|
| JP | 11226265 A | 8/1999 |
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005190465 A | 7/2005 |
| JP | 2005332063 A | 12/2005 |
| JP | 2007071782 A | 3/2007 |
| JP | 3132531 U | 6/2007 |
| JP | 2007324829 A | 12/2007 |
| JP | 2008058102 A | 3/2008 |
| JP | 2009037582 A | 2/2009 |
| JP | 2009183751 A | 8/2009 |
| JP | 2010038707 A | 2/2010 |
| JP | 2010092436 A | 4/2010 |
| JP | 2011501296 A | 1/2011 |
| JP | 2011183374 A | 9/2011 |
| JP | 2012103852 | 5/2012 |
| JP | 2012226482 A | 11/2012 |
| JP | 2013507059 A | 2/2013 |
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |

(56) References Cited

FOREIGN PATENT DOCUMENTS

| JP | 2015513143 A | 4/2015 |
|---|---|---|
| JP | 2015118605 A | 6/2015 |
| JP | 2015121983 A | 7/2015 |
| JP | 2015158461 A | 9/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015228215 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| JP | 2017063916 A | 4/2017 |
| JP | 2018523863 A | 8/2018 |
| WO | 02073385 A1 | 9/2002 |
| WO | 2008078523 A1 | 7/2008 |
| WO | 2009035100 A1 | 3/2009 |
| WO | 2015059887 A1 | 4/2015 |
| WO | 2015121971 A1 | 8/2015 |
| WO | 2015151380 A1 | 10/2015 |
| WO | 2016038953 A1 | 3/2016 |
| WO | 2016186041 A1 | 11/2016 |
| WO | 2017043610 A1 | 3/2017 |

OTHER PUBLICATIONS

International Search Report for related application PCT/JP2018/026551, 4 pages, dated Aug. 7, 2018.
Office Action for related U.S. Appl. No. 16/500,651, 7 pages, dated Apr. 16, 2020.
International Search Report for related PCT Application No. PCT/JP2017/030344, 4 pages, dated Oct. 10, 2017.
International Preliminary Report on Patentability and Written Opinion for related PCT Application No. PCT/ JP2017/015563, 13 pages, dated Oct. 31, 2019.
International Preliminary Report on Patentability and Written Opinion for corresponding PCT Application No. PCT/ JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/ JP2017/033925 16 pages, dated Oct. 31, 2019.
International Preliminary Report on Patentability and Written Opinion for related PCT Application No. PCT/ JP2017/015740 14 pages, dated Oct. 31, 2019.
Notice of Reasons for Refusal for corresponding JP Application No. 2019513214, 12 pages, dated Apr. 28, 2020.
International Search Report for correspodning PCT Application No. PCT/JP2017/044074, 4 pages, dated Jan. 16, 2018.
International Search Report for related PCT Application No. PCT/JP2017/030345, 2 pages, dated Sep. 26, 2017.
International Search Report for related PCT Application No. PCT/JP2017/030909, 3 pages, dated Sep. 26, 2017.
International Search Report for related PCT Application No. PCT/JP2017/044072, 4 pages, dated Jan. 16, 2018.
International Preliminary Report on Patentability and Written Opinion for related PCT Application No. PCT/ JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/ JP2017/044073, 10 pages, dated Jun. 27, 2019.
International Preliminary Report on Patentability and Written Opinion for corresponding PCT Application No. PCTJP2017044074, 12 pages, dated Jun. 18, 2019.
Office Action for related U.S Appl. No. 16/345,071, 10 pages, dated Feb. 19, 2020.
International Preliminary Report on Patentability and Written Opinion for related PCT Application No. PCT/ JP2017/030344, 13 pages, dated Mar. 5, 2020.
International Preliminary Report on Patentability and Written Opinion for related PCT Application No. PCT/ JP2017/030345, 11 pages, dated Mar. 5, 2020.
International Preliminary Report on Patentability and Written Opinion for related PCT Application No. PCT/ JP2017/030932, 16 pages, dated Mar. 12, 2020.
International Preliminary Report on Patentability and Written Opinion for related PCT Application No. PCT/ JP2017/0030909, 11 pages, dated Mar. 12, 2020.
International Search Report for related PCT Application No. PCT/JP2017/015563, 2 pages, dated Jun. 13, 2017.
International Search Report for related PCT Application No. PCT/JP2017/033925, 4 pages, dated Nov. 7, 2017.
International Search Report for related PCT Application No. PCT/JP2017/015740, 4 pages, dated Jul. 4, 2017.
International Search Report for related PCT Application No. PCT/JP2017/016552, 2 pages, dated Jun. 20, 2017.
International Preliminary Report on Patentability and Written Opinion for related PCT Application No. PCTJP2017044075, 15 pages, dated Jun. 27, 2019.
Notice of Reasons for Refusal for corresponding JP Application No. 2019-537506, 4 pages dated Nov. 18, 2020.
Decision to Grant for related JP Application No. JP2019-513523, 5 pages, dated Dec. 24, 2020.
Notification of Reasons for Refusal for related JP Application No. JP2019-537507, 8 pages, dated Dec. 14, 2020.

* cited by examiner

VIBRATION DEVICE AND CONTROL SYSTEM FOR PRESENTING CORRECTED VIBRATION DATA

TECHNICAL FIELD

The present invention relates to a vibration device that presents a vibration to a user, a control system that includes the vibration device, a control apparatus that controls the vibration device, a control method, and a control program.

BACKGROUND ART

In the same manner as in an operation device or the like that is used in connection with a home-use game machine, some devices that are used while worn on the body of or held by the user include a vibration mechanism for vibrating a portion or the whole of the device. Thereby, the device can be vibrated at arbitrary timing and present a vibration to the user.

SUMMARY

Technical Problem

The vibration mechanism of a technique in a conventional example is constituted by a linear actuator and the like and operates while consuming power. The power consumed by the above vibration mechanism is desirably smaller.

The present invention has been made in view of the above circumstances. An object of the present invention is therefore to provide a vibration device capable of presenting a vibration to a user while suppressing power consumption, a control system that includes the vibration device, a control apparatus that controls the vibration device, a control method, and a control program.

Solution to Problem

A control system according to the present invention includes a vibration mechanism configured to generate a vibration and present the vibration to a user, and a control apparatus configured to control the vibration mechanism. The control apparatus includes a vibration data acquisition section configured to acquire vibration data representative of a waveform of a vibration that is to be generated by the vibration mechanism, and a vibration control section configured to cause the vibration mechanism to generate a vibration in accordance with corrected vibration data obtained by executing processing for reducing part of frequency components, included in the waveform represented by the vibration data, other than a resonant frequency of the vibration mechanism.

A control apparatus according to the present invention is a control apparatus for controlling a vibration mechanism that generates a vibration and presents the vibration to a user. The control apparatus includes a vibration data acquisition section configured to acquire vibration data representative of a waveform of a vibration that is to be generated by the vibration mechanism, and a vibration control section configured to cause the vibration mechanism to generate a vibration in accordance with corrected vibration data obtained by executing processing for reducing part of frequency components, included in the waveform represented by the vibration data, other than a resonant frequency of the vibration mechanism.

A vibration device according to the present invention includes a vibration mechanism configured to generate a vibration and present the vibration to a user, and a vibration control section configured to cause the vibration mechanism to generate a vibration in accordance with corrected vibration data obtained from vibration data representative of a waveform of a vibration that is to be generated by the vibration mechanism, the corrected vibration data being obtained by executing processing for reducing part of frequency components included in the waveform other than a resonant frequency of the vibration mechanism.

A control method according to the present invention is a control method of a vibration mechanism that generates a vibration and presents the vibration to a user. The control method includes a step of acquiring vibration data representative of a waveform of a vibration that is to be generated by the vibration mechanism, and a step of causing the vibration mechanism to generate a vibration in accordance with corrected vibration data obtained by executing processing for reducing part of frequency components, included in the waveform represented by the vibration data, other than a resonant frequency of the vibration mechanism.

A program according to the present invention is a program for controlling a vibration mechanism that generates a vibration and presents the vibration to a user. The program causes a computer to function as a vibration data acquisition section configured to acquire vibration data representative of a waveform of a vibration that is to be generated by the vibration mechanism, and a vibration control section configured to cause the vibration mechanism to generate a vibration in accordance with corrected vibration data obtained by executing processing for reducing part of frequency components, included in the waveform represented by the vibration data, other than a resonant frequency of the vibration mechanism. The program may be stored and presented in a computer readable and non-transitory information storage medium.

DESCRIPTION OF EMBODIMENT

An embodiment of the present invention will be described with reference to the accompanying drawings. Note that, in the following description, a size, ratio, arrangement, or the like of each portion is one example, and an example of the present embodiment is not limited to the size, ratio, or arrangement illustrated in the drawings.

A control system 1 according to an example of the embodiment of the present invention includes a control apparatus 10 and a vibration device 20. The vibration device 20 is as exemplified in FIG. 1. In the example of the present embodiment, the vibration device 20 includes a device body 21 and a fixing tool 22 that is one accessory.

The vibration device 20 is used in a state in which an index finger through little finger of a user are passed through the fixing tool 22 and the device body 21 is fixed at a position contacting with a base of a thumb of the user. In the example illustrated in FIG. 1, a right side surface side of the vibration device 20 is pushed to a palm of a right hand of the user and the vibration device 20 is fixed. Further, a size of the vibration device 20 is set to a size such that when the user naturally grasps the device body 21, a fingertip of the thumb of the user reaches an operation section 23 on the front side of the vibration device 20. When a lower half of the device body 21 is grasped with the palm, the middle finger, the ring finger, and the little finger, the user can use the vibration device 20. Even if the user opens the hand from the above state, the vibration device 20 is fixed to the hand of the user by the fixing tool 22 and therefore it does not drop.

Figure 1:
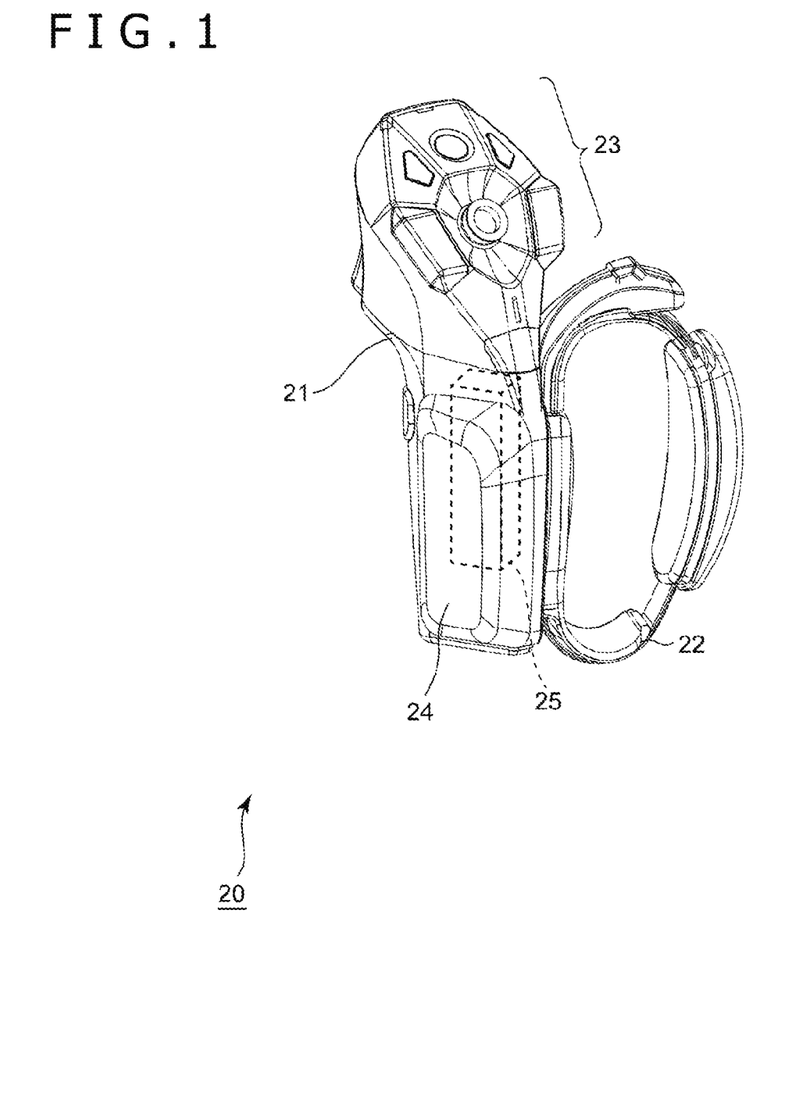
FIG. 1 is a perspective diagram in which a vibration device according to an embodiment of the present invention is viewed from a front face side.

The operation section 23 in which various operation buttons etc. are arranged is provided on the upper side of the device body 21. When the user operates the operation buttons etc. arranged in the operation section 23, content thereof is transmitted to the control apparatus 10.

A rechargeable battery 24 as another accessory is fixed to a side surface opposite to a side surface to which the fixing tool 22 of the device body 21 is fixed. The rechargeable battery 24 supplies power necessary for operations of the vibration device 20. The vibration device 20 regularly transmits information regarding a battery capacity of the rechargeable battery 24 to the control apparatus 10.

Further, a vibration mechanism 25 is incorporated in a housing of the device body 21. The vibration mechanism 25 is a linear actuator or the like and vibrates the device body 21 in accordance with a control signal received from the control apparatus 10. Thereby, vibrations are transmitted to the hand of the user that wears the vibration device 20. The vibration mechanism 25 may vibrate the device body 21 in one direction or in a plurality of directions. The vibration mechanism 25 consumes power supplied from the rechargeable battery 24 for operations. Note that a plurality of the vibration mechanisms 25 may be housed in the device body 21.

The control apparatus 10 may be an information processing apparatus communicably connected to the vibration device 20 and may be a home-use game machine, a personal computer, or the like, for example. Further, in the present embodiment, the control apparatus 10 is communicably connected also to a display apparatus 14. As exemplified in FIG. 2, the control apparatus 10 includes a control section 11, a storage section 12, and a communication section 13.

Figure 2:
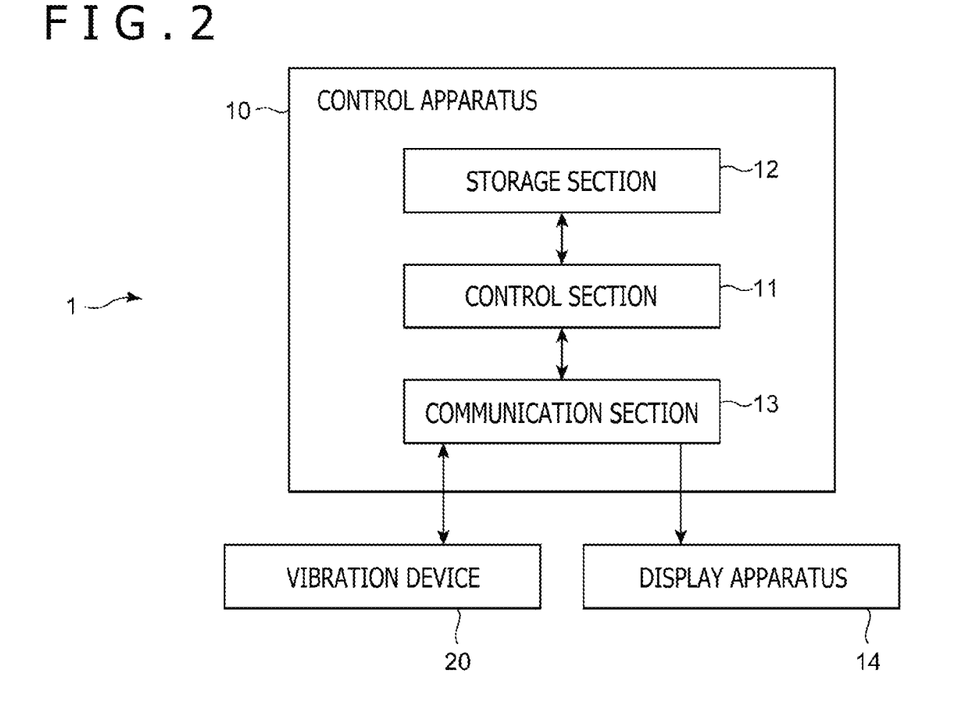
FIG. 2 is a block diagram illustrating a configuration example of a control apparatus according to the embodiment of the present invention.

The control section 11 includes a program control device such as a central processing unit (CPU) and executes various types of information processing in accordance with programs stored in the storage section 12. Specific content of the processing of the control section 11 will be described in detail below.

The storage section 12 is a memory device or the like and retains programs executed by the control section 11. The programs may be stored and presented in a computer readable and non-transitory storage medium, and copied in the storage section 12. Further, the storage section 12 operates also as a work memory of the control section 11.

The communication section 13 includes a serial interface such as a universal serial bus (USB) or a wireless communication interface such as Bluetooth (registered trademark). The control apparatus 10 is communicably connected to the vibration device 20 via the communication section 13. Particularly, in the present embodiment, the communication section 13 receives information indicative of content of the operation performed by the user or information regarding a battery residual amount of the rechargeable battery 24 from the vibration device 20. Further, the communication section 13 transits a control signal for operating the vibration mechanism 25 in accordance with an instruction from the control section 11.

Further, the communication section 13 includes a communication interface for communicating with the display section 14 wirelessly or by wire. The control section 10 transmits data of a video image to be displayed by the display apparatus 14 to the display apparatus 14 via the communication section 13.

The display apparatus 14 displays a video image based on a video image signal transmitted from the control apparatus 10. The display apparatus 14 may be a device of a type used by the user wearing on the head, such as a head-mounted display.

Hereinafter, operations of the control section 11 of the control apparatus 10 will be described. In the present embodiment, as exemplified in FIG. 3, the control section 11 functionally includes an application execution section 31, a battery residual amount acquisition section 32, a vibration data acquisition section 33, and a vibration control section 34. The control section 11 operates in accordance with a program stored in the storage section 12 to thereby achieve the above functions. The program may be presented to the control apparatus 10 via a communication network such as the Internet. Alternatively, the program may be stored and presented in a computer readable information storage medium such as an optical disk.

Figure 3:
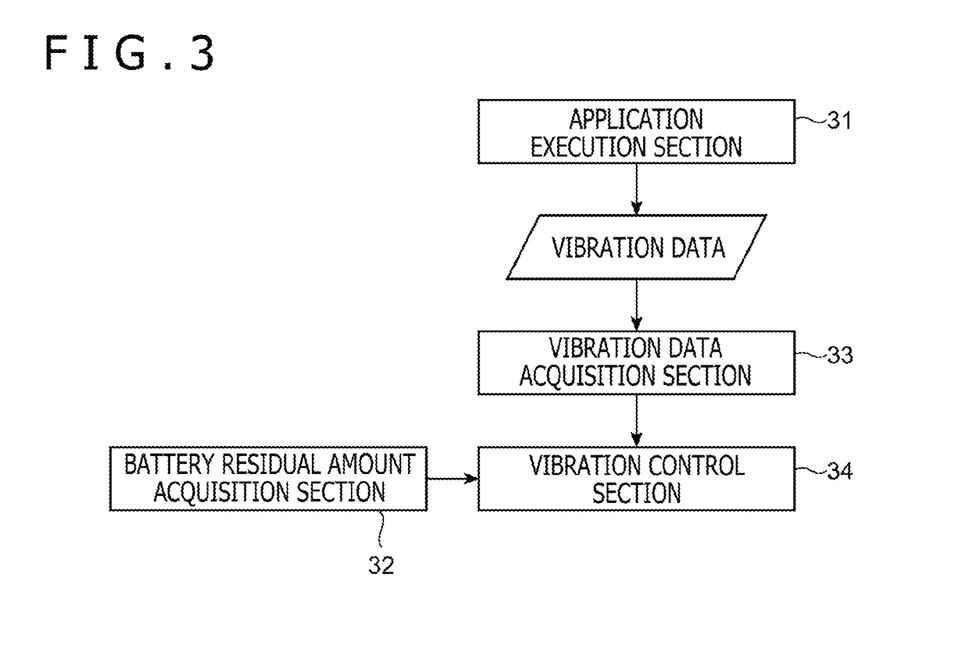
FIG. 3 is a functional block diagram illustrating functions of the control apparatus according to the embodiment of the present invention.

The application execution section 31 is achieved by the control section 11 executing an application program of a game etc. The application execution section 31 executes various types of processing, for example, in accordance with content of an operation preformed by the user on the vibration device 20 and causes processing results to be displayed on a screen of the display apparatus 14. The application execution section 31 may construct a virtual space in which various virtual objects are arranged and present an image indicative of an internal appearance to the user, for example.

Figure 4:
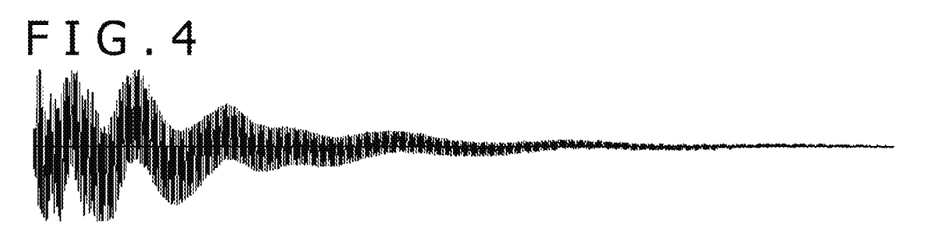
FIG. 4 is a diagram illustrating an example of vibration data.

Further, the application execution section 31 outputs vibration data for vibrating the vibration device 20 in accordance with content of the processing. It is assumed that the vibration data is data for indicating how the vibration mechanism 25 of the vibration device 20 is to be vibrated and is here data obtained by encoding waveform data representative of a waveform of the vibration that is to be generated by the vibration mechanism 25. That is, an amplitude of the waveform included in the vibration data indicates an intensity of the vibration and a frequency thereof indicates a period of the vibration. This vibration data may be described with a format having a resemblance to audio data. Further, it is assumed that a waveform in which vibrations of a plurality of frequencies are overlapped is included in the vibration data similarly to audio data. FIG. 4 illustrates an example of the waveform included in the vibration data. The vibration data output by the application execution section 31 is stored in a buffer area secured in the storage section 12.

The battery residual amount acquisition section 32 regularly acquires information regarding the battery residual amount of the rechargeable battery 24 from the vibration device 20. The information regarding the battery residual amount may be information indicating the percentage of the battery capacity of the rechargeable battery 24 at the time of acquiring the information with respect to the battery capacity at the time of full charge, for example.

The vibration data acquisition section 33 sequentially reads out and acquires the vibration data stored in the buffer area by the application execution section 31.

The vibration control section 34 transmits content of the vibration data acquired by the vibration data acquisition section 33 to the vibration device 20. The vibration device 20 causes the vibration mechanism 25 to operate on the basis of the vibration data and thereby causes the vibration mechanism 25 to generate vibrations in accordance with a waveform represented by the vibration data. Thereby, the device body 21 of the vibration device 20 can be vibrated in accordance with conditions of a game etc. executed by the application execution section 31 according to the present embodiment and the vibration can be presented to the user.

Further, if necessary, in the present embodiment, the vibration control section 34 executes power saving processing for processing content of the vibration data in order to reduce power necessary for operations of the vibration mechanism 25. Then, the vibration control section 34 transmits the vibration data after the processing to the vibration device 20. Hereinafter, the vibration data after the processing obtained by the power saving processing is referred to as corrected vibration data. In a case in which the vibration mechanism 25 is desired to operate while saving power, the vibration control section 34 specifically executes processing for reducing part of frequency components included in the waveform represented by the vibration data. The part of frequency components are frequency components obtained by excluding a resonant frequency of the vibration mechanism 25. Here, the resonant frequency is a frequency at which the vibration mechanism 25 vibrates most effectively. Further, power consumed by the vibration mechanism 25 through the vibration at the frequency is smaller than that at other frequencies.

Figure 5:
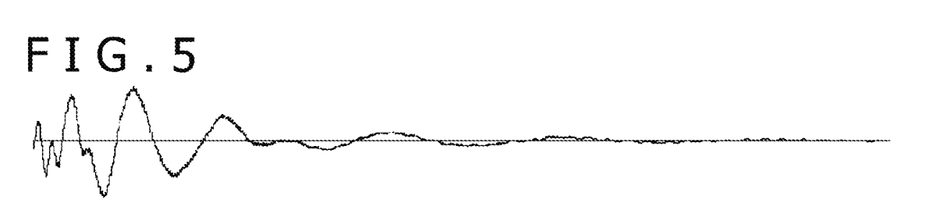
FIG. 5 is a diagram illustrating an example of corrected vibration data.

The vibration control section 34 executes low-pass filter processing on the vibration data, for example. This is signal processing for cutting off a high-frequency component higher than or equal to a predetermined cutoff frequency in the waveform data and for directly passing frequency components lower than the cutoff frequency. The cutoff frequency in this case is set to a frequency higher than the resonant frequency of the vibration mechanism 25. FIG. 5 illustrates an example of a waveform represented by the corrected vibration data after executing the power saving processing through the above low-pass filter. In addition, FIG. 5 illustrates a waveform in which the high-frequency component has been excluded from the vibration data illustrated in FIG. 4. The high-frequency component is excluded as described above to thereby reduce power consumption generated by the operations of the vibration mechanism 25.

By contrast, the vibration control section 34 may execute high-pass filter processing for cutting off a low-frequency component on the vibration data. Alternatively, the vibration control section 34 may execute band-pass filter processing for passing only a frequency component of a predetermined band including the resonant frequency of the vibration mechanism 25. Even with the above pieces of processing, the power consumption generated by the operations of the vibration mechanism 25 can be reduced.

Note that when the above power saving processing is executed, vibrations of part of frequencies are not presented. Therefore, there is a possibility that a sense felt by the user on the basis of vibrations of the vibration device 20 slightly changes. However, by particularly leaving a main frequency component including the resonant frequency of the vibration mechanism 25 without being removed, an overall inclination of the vibrations presented to the user is allowed to be kept without a large change. Even in a case in which the above power saving processing is executed, the amplitude of the main frequency component in the vibration data is maintained as it is. Therefore, there is less possibility that the user feels that an intensity of the vibrations is weakened. Specifically, by executing the power saving processing for reducing part of frequency components of vibration waveforms, power necessary for vibration control can be suppressed without stopping the generation of vibrations itself or weakening an intensity of the vibrations.

Further, in place of the above-described simple filter processing, or in addition thereto, the vibration control section 34 may execute pitch shift processing for shifting part of frequency components of the waveform to be approximated to the resonant frequency of the vibration mechanism 25 so that the frequency components in the vicinity of the resonant frequency become large. The pitch shift processing in this case can be achieved by signal processing similar to processing on audio data. Specifically, the vibration control section 34 may shift frequency components higher than the resonant frequency to the low-frequency side. Alternatively, the vibration control section 34 may shift frequency components lower than the resonant frequency to the high-frequency side. Even with the above processing, part of frequency components included in the vibration data can be reduced and power necessary for the operations of the vibration mechanism 25 can be reduced.

The vibration control section 34 may always execute the power saving processing described above or may execute the power saving processing in accordance with a situation of the vibration device 20. Particularly, in the present embodiment, it is assumed that the vibration control section 34 determines whether or not to execute the power saving processing by using information regarding the battery residual amount acquired by the battery residual amount acquisition section 32.

Specifically, if it is determined that the battery residual amount of the rechargeable battery 24 is smaller than a predetermined threshold, the vibration control section 34 starts executing the power saving processing on the vibration data. Through the process, in a case in which the battery residual amount of the rechargeable battery 24 is sufficient, the vibration control section 34 causes the vibration mechanism 25 to vibrate in accordance with the original vibration data. By contrast, in a case in which the battery residual amount becomes small, the vibration control section 34 can continue the vibration control while suppressing the power consumption generated by the operations of the vibration mechanism 25. Further, the vibration control section 34 may change content of the power saving processing in accordance with the battery residual amount of the rechargeable battery 24. For example, as the battery residual amount is more reduced, the vibration control section 34 may stepwise reduce the cutoff frequency at the time of executing the low-pass filter processing to be approximated to the resonant frequency of the vibration mechanism 25.

Note that the vibration control section 34 may determine whether or not to execute the power saving processing on the basis of setting of the user. In this case, in accordance with an option previously specified by the user, the vibration control section 34 determines whether or not to execute the power saving processing. In the above option, a mode in which the power saving processing is always executed regardless of the battery residual amount or a mode in which the power saving processing is always prevented from being executed may be included. Further, in a case in which the power saving processing is executed on the vibration data in accordance with the battery residual amount, the user may specify a value of the battery residual amount that is to be a threshold with which the power saving processing is started. Further, the vibration control section 34 may acquire information indicative of whether or not the rechargeable battery 24 is charged, and may not execute the power saving processing while the charging is being performed.

Further, the vibration control section 34 may execute a plurality of kinds of the power saving processing described above in accordance with a predetermined priority. The vibration control section 34 may execute the low-pass filter processing in which a high-frequency component is removed at a stage at which the battery residual amount is smaller than a first threshold, for example. Further, in a case in which the battery residual amount is reduced and smaller than a second threshold, the vibration control section 34 may also execute the high-pass filter processing in which a low-frequency component is removed in addition to the low-pass filter processing, for example. Further, at the stage at which the battery residual amount is smaller than the first threshold, the vibration control section 34 may first execute the high-pass filter processing and in a case in which the battery residual amount is smaller than the second threshold, the vibration control section 34 may execute both pieces of the processing.

Further, in a case in which a plurality of the vibration devices 20 are connected to the control apparatus 10, the vibration control section 34 may determine whether or not to execute the power saving processing on the individual vibration devices 20 on the basis of the battery residual amounts of the rechargeable batteries 24 housed in the plurality of vibration devices 20.

As a specific example, it is assumed that one user wears two vibration devices 20, that is, a first vibration device 20a on the right hand and a second vibration device 20b on the left hand. Here, the first vibration device 20a operates while consuming power supplied by a housed first rechargeable battery 24a, and the second vibration device 20b operates while consuming power supplied by a housed second rechargeable battery 24b. In this case, at every predetermined time, the battery residual amount acquisition section 32 acquires both pieces of information regarding the battery residual amount of the first rechargeable battery 24a housed in the first vibration device 20a and the battery residual amount of the second rechargeable battery 24b housed in the second vibration device 20b. Then, the vibration control section 34 determines whether or not to execute the power saving processing on each of the vibration devices 20, on the basis of both the acquired battery residual amount of the first rechargeable battery 24a and the acquired battery residual amount of the second rechargeable battery 24b.

For example, the vibration control section 34 compares the battery residual amount of the first rechargeable battery 24a and that of the second rechargeable battery 24b and executes the power saving processing on the vibration device 20 that houses the rechargeable battery 24 in which the battery residual amount is smaller. In this case, the vibration control section 34 may always execute the power saving processing on the vibration device 20 in which the battery residual amount is smaller. Alternatively, similarly to a case in which one vibration device 20 described above is subjected to control, the vibration control section 34 may execute the power saving processing in a case in which an absolute value of the battery residual amount is smaller than a predetermined value, or the vibration control section 34 may change content of the power saving processing in accordance with the absolute value of the battery residual amount.

On the other hand, it is assumed that, concerning the vibration device 20 in which the battery residual amount is larger, the vibration control section 34 always prevent the power saving processing from being executed irrespective of the absolute value. In this example, in a case in which the battery residual amount of the first rechargeable battery 24a is approximately matched with the battery residual amount of the second rechargeable battery 24b (that is, in a case in which a difference between the two battery residual amounts is smaller than a predetermined value), the vibration control section 34 does not execute the power saving processing on any of the vibration devices 20. Alternatively, also concerning the vibration device 20 in which the battery residual amount is larger, the vibration control section 34 may execute the power saving processing in a case in which the battery residual amount becomes small extremely. In this case, it is assumed that, between the vibration device 20 in which the battery residual amount is larger and the vibration device 20 in which the battery residual amount is smaller, a threshold of the battery residual amount for determining whether or not to execute the power saving processing is changed. Further, in a case in which the power saving processing is simultaneously executed on the plurality of vibration devices 20, the content of the power saving processing may be made different among the plurality of vibration devices 20 so that power consumption can be more reduced in the vibration device 20 in which the battery residual amount is smaller.

According to the control described above, a situation in which although the battery capacity of one vibration device 20 is sufficient, since the battery capacity of the other vibration device 20 is insufficient, operations cannot be continued can be made difficult to occur. In general, in a case in which the plurality of vibration devices 20 are used simultaneously, if only the battery capacity of some of the devices gets insufficient, the system cannot be used any more in some cases. The power saving processing is preferentially executed on the vibration device 20 in which the battery residual amount is smaller, and thereby the above situation can be avoided.

Figure 6A:
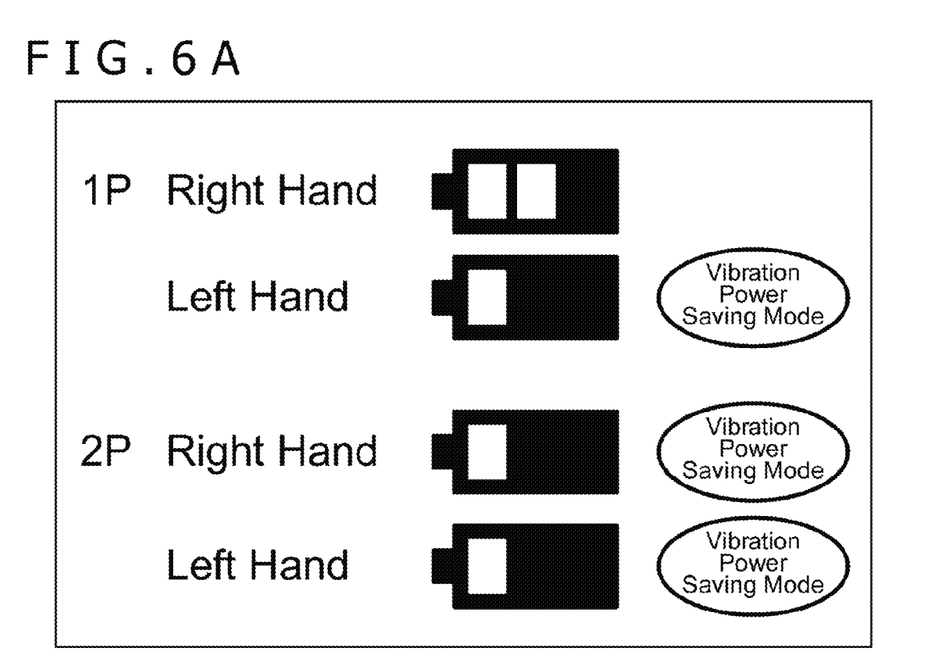
FIG. 6A is a diagram illustrating a display example at the time of executing power saving processing.

The vibration control section 34 may display information indicative of whether or not the power saving processing is being executed on a screen of the display apparatus 14 as well as the battery residual amount of the rechargeable battery 24 housed in the vibration device 20. FIG. 6A illustrates a display example in this case. In this example, a first user and a second user each wear the vibration devices 20 on the left and right hands. The four vibration devices 20 in total are connected to the control apparatus 10. Further, in each of the four vibration devices 20, an approximate battery residual amount of the rechargeable battery 24 is indicated by scale. Further, the vibration device 20 in which the battery residual amount is smaller than a given threshold is subjected to an application of the power saving processing, a mark image indicative of the above is displayed on the screen. Specifically, in FIG. 6A, three vibration devices 20 in total including the vibration device 20 that is mounted on the left hand of the first user (1P) and the vibration devices 20 that are mounted on the two hands of the second user (2P) are subjected to an application of the power saving processing due to the shortage of the battery residual amount. By contrast, since the battery residual amount of the vibration device 20 that is mounted on the right hand by the first user is not smaller than the threshold, the power saving processing is not executed on that vibration device 20.

Figure 6B:
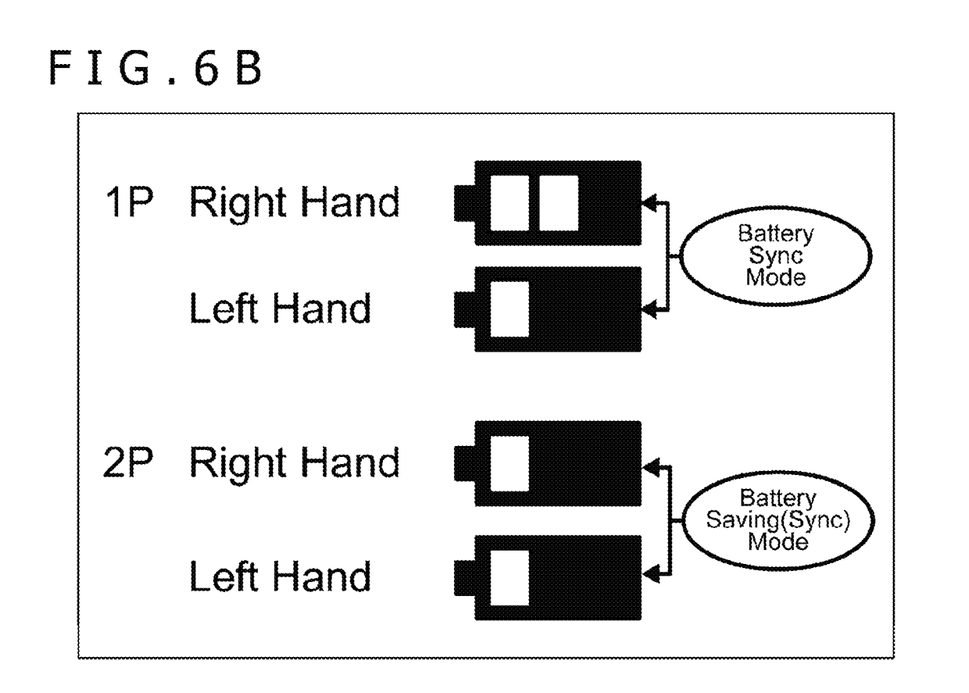
FIG. 6B is a diagram illustrating another display example at the time of executing the power saving processing.

Further, in a case in which two vibration devices 20 that are mounted on the left and right hands of each user operate in the operation mode for determining whether or not to execute the power saving processing on the basis of a result obtained by comparing the battery residual amounts of both with each other as described above, the vibration control section 34 may perform a display indicative of the above. FIG. 6B illustrates a display example in this case. In this example, four vibration devices 20 in total are connected to the control apparatus 10 similarly to FIG. 6A. A difference in battery residual amount is caused between the vibration devices 20 that are mounted on the two hands of the first user. Therefore, the power saving processing is executed on only one vibration device 20 (here, the vibration device 20 that is mounted on the left hand of the first user) in which the battery residual amount is insufficient. In FIG. 6B, the fact that the two vibration devices 20 that are mounted on the first user operate in the operation mode in which the battery residual amounts are compared with each other is indicated by the mark image of "Battery Sync Mode." Further, the two vibration devices 20 that are mounted on the second user operate in a similar way in the operation mode in which the battery residual amounts are compared with each other. Both of the battery residual amounts are insufficient and both of the vibration devices 20 are subjected to the power saving processing. The above fact is indicated by the mark image of "Battery Saving (Sync) Mode."

By using the control system 1 according to the present embodiment described above, power consumption can be suppressed when the vibration control is performed by the vibration device 20, if necessary.

Note that embodiments of the present invention are not limited to the embodiment described above. In the above description, for example, the vibration device 20 is a device of a type mounted on the palm of the user by using the fixing tool 22. However, not limited thereto, the vibration device 20 may be a device of a type which is used while grasped with the hand by the user. Alternatively, the vibration device 20 may be a device of a type mounted on any part other than the palm. Further, here, the vibration device 20 is an operation device that receives an operation input of the user. However, the vibration device 20 is not limited to the above device. The vibration device 20 may be a device that is used exclusively for presentation of vibrations to the user or a device that is used for other purpose.

Further, in the above description, the control apparatus 10 separately provided from the vibration device 20 acquires the battery residual amount of the rechargeable battery 24 and executes the power saving processing for processing the vibration data in accordance with the acquired battery residual amount. However, embodiments of the present invention are not limited to the above embodiment. The control apparatus 10 according to the embodiment of the present invention may be achieved by a microcomputer etc. housed in the vibration device 20, for example. In this case, the control apparatus 10 within the vibration device 20 receives the vibration data from an external information processing apparatus and executes the power saving processing on the vibration data in accordance with the battery residual amount or the like.

Further, the vibration device 20 may include a primary battery instead of the rechargeable battery 24 and operate while consuming power supplied by the primary battery. Also in this case, part of frequency components of the vibration data is reduced, and thereby power consumption of the battery can be suppressed.

REFERENCE SIGNS LIST

1 Control system, 10 Control apparatus, 11 Control section, 12 Storage section, 13 Communication section, 14 Display apparatus, 20 Vibration device, 21 Device body, 22 Fixing tool, 23 Operation section, 24 Rechargeable battery, 25 Vibration mechanism, 31 Application execution section, 32 Battery residual amount acquisition section, 33 Vibration data acquisition section, 34 Vibration control section

The invention claimed is:

1. A control system, comprising:
a display; and
a handheld controller, including:
a first vibration mechanism configured to receive power from a first battery and generate a first vibration and present the first vibration to a user;
a second vibration mechanism configured to receive power from a second battery and generate a second vibration and present the second vibration to the user; and
a control apparatus configured to control the vibration mechanism, wherein the control apparatus includes:
a vibration data acquisition section configured to acquire first vibration data representative of a first waveform of the first vibration that is to be generated by the first vibration mechanism, and to acquire second vibration data representative of a second waveform of the second vibration that is to be generated by the second vibration mechanism,
a battery residual amount acquisition section configured to acquire information regarding a first battery residual amount of the first battery and a second battery residual amount of the second battery, and
a vibration control section configured to:
(i) determine, based on the first battery residual amount of the first battery, whether or not to cause the first vibration mechanism to generate the first vibration in accordance with corrected first vibration data obtained by reducing some frequency components in the first waveform, other than a first resonant frequency of the first vibration mechanism, and indicate on the display first information, indicative of whether the first vibration is generated in accordance with the corrected first vibration data, and
(ii) determine, based on the second battery residual amount of the second battery, whether or not to cause the second vibration mechanism to generate the second vibration in accordance with corrected second vibration data obtained by reducing some frequency components in the second waveform, other than a second resonant frequency of the second vibration mechanism, and indicate on the display second information, indicative of whether the second vibration is generated in accordance with the corrected second vibration data.

2. The control system according to claim 1, wherein at least one of:

the some frequency components in the first waveform include at least one frequency component higher than the first resonant frequency of the first vibration mechanism; and the some frequency components in the second waveform include at least one frequency component higher than the second resonant frequency of the second vibration mechanism.

3. The control system according to claim 2, wherein at least one of:

the processing for reducing the some frequency components in the first waveform includes low-pass filter processing for cutting off the at least one frequency component higher than or equal to a first cutoff frequency included in the first waveform represented by the first vibration data; and the processing for reducing the some frequency components in the second waveform includes low-pass filter processing for cutting off the at least one frequency component higher than or equal to a second cutoff frequency included in the second waveform represented by the second vibration data.

4. The control system according to claim 1, wherein at least one of:

the processing for reducing the some frequency components in the first waveform includes pitch shift processing for shifting the some frequency components included in the first waveform represented by the first vibration data so as to be approximated to the first resonant frequency of the first vibration mechanism; and the processing for reducing the some frequency components in the second waveform includes pitch shift processing for shifting the some frequency components included in the second waveform represented by the second vibration data so as to be approximated to the second resonant frequency of the second vibration mechanism.

5. The control system according to claim 1, wherein the vibration control section compares the first battery residual amount of the first battery and the second battery residual amount of the second battery and executes the processing for reducing the some frequency components on the first or second vibration data for vibrating the first or second vibration mechanism that is operated by power supplied by the first or second battery in which the first or second battery residual amount is smaller.

6. A control apparatus for controlling a first vibration mechanism configured to receive power from a first battery and generate a first vibration and presents the first vibration to a user, and for controlling a second vibration mechanism configured to receive power from a second battery and generate a second vibration and present the second vibration to the user comprising:

a vibration data acquisition section configured to acquire first vibration data representative of a first waveform of the first vibration that is to be generated by the first vibration mechanism, and to acquire second vibration data representative of a second waveform of the second vibration that is to be generated by the second vibration mechanism;

a battery residual amount acquisition section configured to acquire information regarding a first battery residual amount of the first battery and a second battery residual amount of the second battery; and a vibration control section configured to:
(i) determine, based on the first battery residual amount of the first battery, whether or not to cause the first vibration mechanism to generate the first vibration in accordance with corrected first vibration data obtained by reducing some frequency components in the first waveform, other than a first resonant frequency of the first vibration mechanism, and for indication on a display, first information, indicative of whether the first vibration is generated in accordance with the corrected first vibration data, and
(ii) determine, based on the second battery residual amount of the second battery, whether or not to cause the second vibration mechanism to generate the second vibration in accordance with corrected second vibration data obtained by reducing some frequency components in the second waveform, other than a second resonant frequency of the second vibration mechanism, and indicate on the display second information, indicative of whether the second vibration is generated in accordance with the corrected second vibration data.

7. A non-transitory, computer readable storage medium containing a program, which when executed by a computer, causes the computer to control a first vibration mechanism configured to receive power from a first battery and generate a first vibration and presents the first vibration to a user, and for controlling a second vibration mechanism configured to receive power from a second battery and generate a second vibration and present the second vibration to the user, the program causing the computer to carry out actions, comprising:

acquiring first vibration data representative of a first waveform of the first vibration that is to be generated by the first vibration mechanism;

acquiring second vibration data representative of a second waveform of the second vibration that is to be generated by the second vibration mechanism;

acquiring information regarding a first battery residual amount of the first battery and a second battery residual amount of the second battery;

determining, based on the first battery residual amount of the first battery, whether or not to cause the first vibration mechanism to generate the first vibration in accordance with corrected first vibration data obtained by reducing some frequency components in the first waveform, other than a first resonant frequency of the first vibration mechanism and for indication on a display, first information, indicative of whether the first vibration is generated in accordance with the corrected first vibration data; and determining, based on the second battery residual amount of the second battery, whether or not to cause the second vibration mechanism to generate the second vibration in accordance with corrected second vibration data obtained by reducing some frequency components in the second waveform, other than a second resonant frequency of the second vibration mechanism, and indicate on the display second information, indicative of whether the second vibration is generated in accordance with the corrected second vibration data.

* * * * *